Feb. 12, 1929.
W. H. COTTON
DRAFT GEAR
Filed Jan. 7, 1924
1,702,040
2 Sheets-Sheet 1
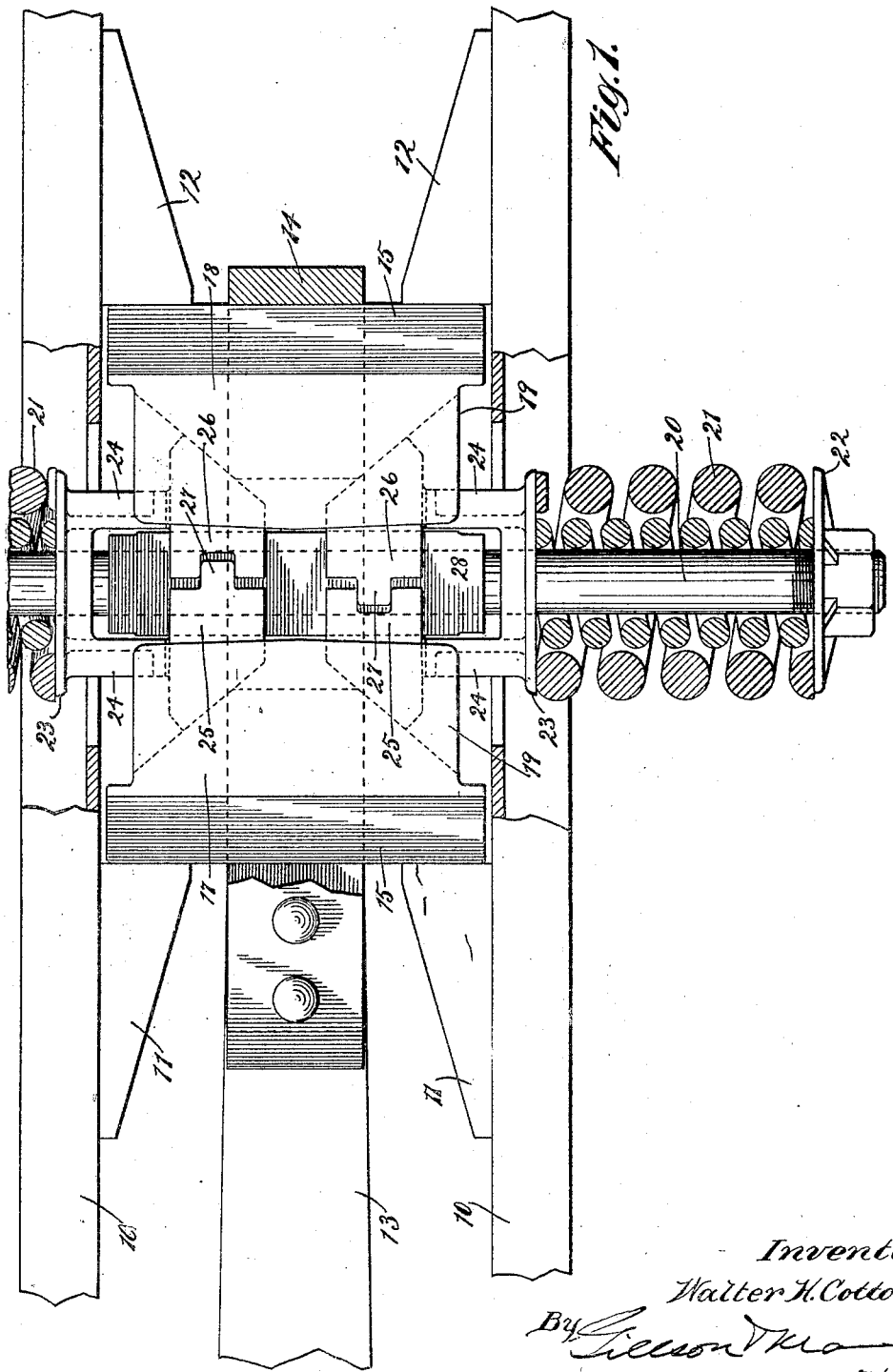
Inventor:
Walter H. Cotton

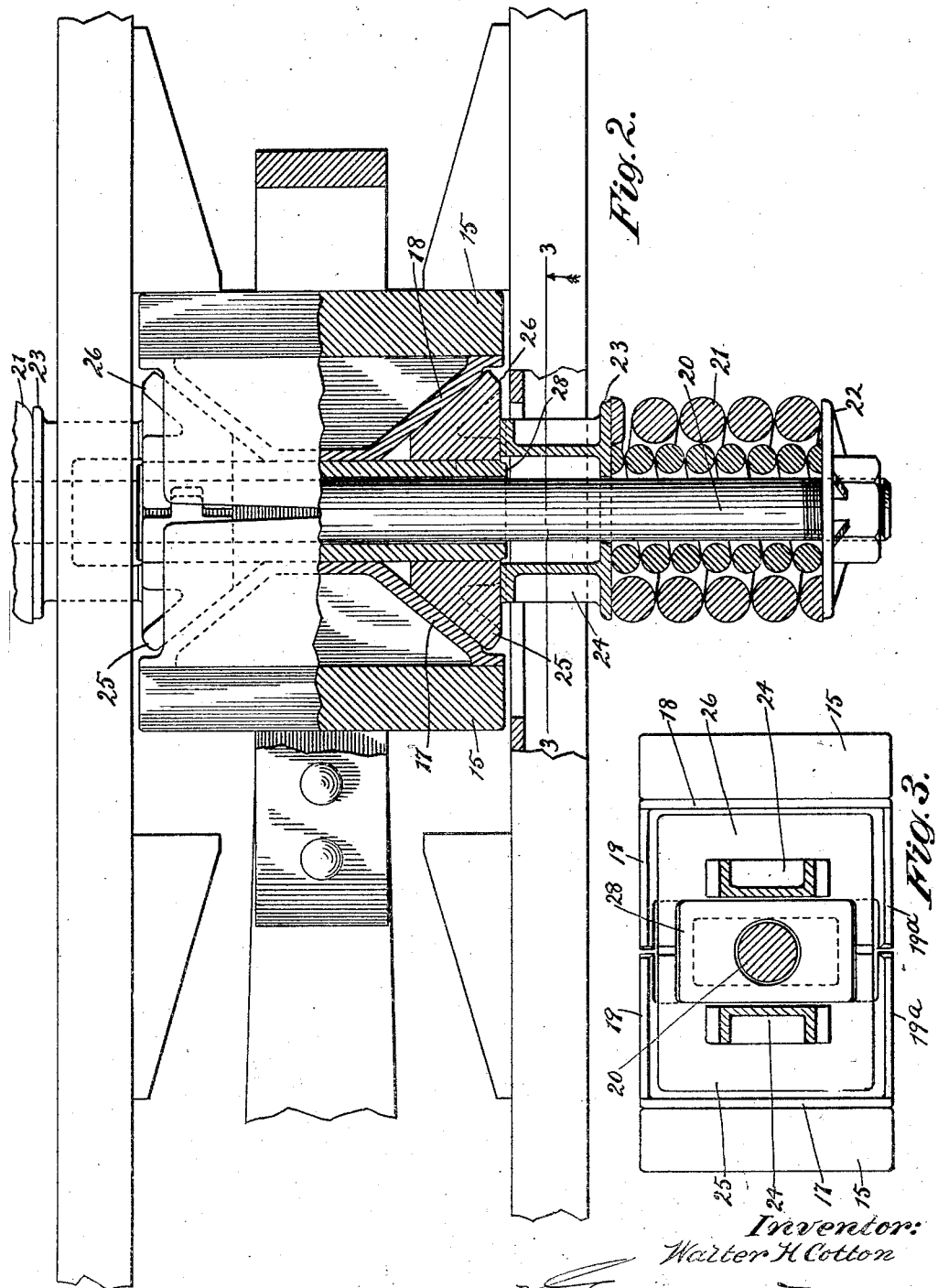

Patented Feb. 12, 1929.

1,702,040

UNITED STATES PATENT OFFICE.

WALTER H. COTTON, OF CHICAGO, ILLINOIS, ASSIGNOR TO UNION DRAFT GEAR COMPANY, OF CHICAGO, ILLINOIS, A CORPORATION OF DELAWARE.

DRAFT GEAR.

Application filed January 7, 1924. Serial No. 684,789.

The invention relates to draft gears of the friction type for use in connection with railway cars and particularly in freight service. The objects of the invention are to secure simplicity, strength and high efficiency and the invention consists in a structure such as hereinafter described and as illustrated in the accompanying drawings, in which Fig. 1 is a detailed plan view, partly in section of the gear, details of associated parts of the car being shown;

Fig. 2 is a similar view, the gear being under full compression;

Fig. 3 is a detail side elevation of the gear, partly in section on the line 3—3 of Fig. 2, the car sill, however, being omitted.

For the purpose of showing the relation of the gear to the car to which it is applied, there is shown at 10—10 a pair of draft sills; at 11—11 a pair of draft lugs; at 12—12 a pair of buffing lugs; at 13 the butt of a coupler; and at 14 a coupler extension, loop or yoke, for encompassing the gear. These elements form no part of the invention and may be of any desired form.

The gear comprises a pair of follower plates 15—15, which cooperate respectively with the draft and the buffing lugs. Associated with each of these plates is a wedging element 17—18 which while shown as separate castings may each, if desired, be cast integrally with the followers. These wedging elements are provided with converging wedging faces which, however, as shown, do not meet. They are also provided with forwardly projecting top and bottom flanges as shown respectively at 19—19ª, these flanges serving to enclose other elements of the gear and the lower one forming a support therefor.

A tension rod 20 projects transversely through the gear and through suitable slots in the sills 10—10. Upon each of the end portions of the rod 20 there is mounted a helical spring 21 which as shown may consist of a pair of nested springs. Each of these springs reacts between a seat 22 in the form of a nut screwed upon the end of the rod, and a seat 23 which slides upon the rod and has legs as 24 which project through the sill slot.

Cooperating with the two wedging faces of each of the elements 17 and 18 are a pair of wedge blocks 25—25 and 26—26, each of these blocks bearing against one of the legs of the spring seat 23. The wedge blocks 25—26 at each side of the gear are interlocked by means of a tenon 27 formed upon one of them and entering a complementary mortise in the other. The third or inner face of each of the blocks 25—26 is perpendicular to the axis of the gear and slidably engages a box-shaped friction element 28 which is loosely sleeved upon the rod 20, and which is held against material transverse movement relatively to the axis of the gear by the sills 10—10.

As the gear is compressed in either direction, the wedging elements 25—26 are forced outwardly by the elements 17—18 against the resistance of the springs 21 and slide with heavy frictional engagement upon the vertical walls of the member 28. Upon the relief of the compressive force the parts of the gear are restored to normal position of Fig. 1 under the influence of the springs 21.

Various changes of detail may be made within the scope of the invention.

I claim as my invention:

1. In a draft gear in combination with followers and spreading wedges, a friction element having faces perpendicular to the axis of the gear, interlocking wedge blocks cooperating with the spreading wedges and frictionally engaging the faces of the friction element, and springs resisting the outward movement of the blocks.

2. In a draft gear, in combination with followers and spreading wedges, a friction element having faces perpendicular to the axis of the gear, interlocking wedge blocks cooperating with the spreading wedges and frictionally engaging the faces of the friction element, springs resisting the outward movement of the blocks, and a spring seat for the inner end of each spring and having instanding legs bearing, respectively, on the two wedge blocks at the adjacent sides of the gear.

3. In a draft gear, in combination with a pair of followers, and central spreading wedges projecting inwardly from the followers and provided with bottom flanges, a friction element having faces perpendicular to the axis of the gear, wedge blocks cooperating with the several faces of the spreading wedges and having faces bearing on the faces of the friction element and riding on the named flanges, such blocks having forwardly projecting arms for supporting the friction element, and springs resisting the outward movement of the blocks.

WALTER H. COTTON.